United States Patent [19]

Tateishi et al.

[11] Patent Number: 4,851,919
[45] Date of Patent: Jul. 25, 1989

[54] PICTURE IMAGE DATA PROCESSOR

[75] Inventors: Toru Tateishi, Kokubunji; Sinzi Sato, Yokohama, both of Japan

[73] Assignee: Kabushiki Kaisha Toshiba, Kawasaki, Japan

[21] Appl. No.: 151,183

[22] Filed: Feb. 1, 1988

[30] Foreign Application Priority Data

Feb. 3, 1987 [JP] Japan .................................. 62-22947
Feb. 3, 1987 [JP] Japan .................................. 62-22948

[51] Int. Cl.$^4$ ........................................... H04N 1/411
[52] U.S. Cl. .................................... 358/443; 358/426
[58] Field of Search ....................... 358/280, 260, 133; 382/56

[56] References Cited

U.S. PATENT DOCUMENTS

| 4,313,138 | 1/1982 | Kanda | 358/280 |
| 4,396,952 | 8/1983 | Tisue | 358/133 |
| 4,724,483 | 2/1988 | Shinada | 382/56 |
| 4,743,973 | 5/1988 | Endo | 358/260 |

FOREIGN PATENT DOCUMENTS 8000115 1/1981 PCT Int'l Appl. .

Primary Examiner—James J. Groody
Assistant Examiner—Jerome Grant
Attorney, Agent, or Firm—Finnegan, Henderson, Farabow, Garrett & Dunner

[57] ABSTRACT

A picture image data processor produces processed picture data including half of the total lines of the original picture data by processing the original picture data every second line. The processor comprises buffers for storing processed picture data for a line processed immediately before a line currently being processed, picture data on a line subsequent to the line processed immediately before a line currently being processed, and not-yet-processed picture data on a line currently being processed, respectively. The data stored in the buffers and picture data currently being scanned are selectively supplied to a logic circuit, and picture data in the line currently being processed are processed.

8 Claims, 3 Drawing Sheets

| LINE | PICTURE DATA | | |
|---|---|---|---|
| 0 | --- | 0 | --- |
| 1 | --- | 1 | --- |
| 2 | --- | 1 | --- |
| 3 | --- | 1 | --- |
| 4 | --- | 1 | --- |
| 5 | --- | 1 | --- |
| 6 | --- | 0 | --- |
| 7 | --- | 1 | --- |

$C' = A(B \cdot C + (B+C)\bar{D}) + \bar{A} \cdot (B+C)$

| A | B | C | D | C' |
|---|---|---|---|---|
| 0 | 1 | 1 | 1 | 1 |
| 1 | 1 | 1 | 1 | 1 |
| 1 | 1 | 0 | 1 | 0 |

PICTURE IMAGE DATA PROCESSOR

BACKGROUND OF THE INVENTION

1. Field of the Invention

The present invention relates to a picture image data processor used in a facsimile system or the like.

2. Description of the Related Art

In order to efficiently transmit more picture data with a constant transmission rate, a prior art picture image data processor used in a facimile system converts a picture image data read out from an original document and corresponding to two lines, to a picture image data corresponding to one line for its transmission.

In this case, the transmission of data only by omitting the one-line data causes thin or fine lines of the original document picture to be lost so that, when the data is received and reproduced at the side of a receiver the received data is not exactly the same as the original data, that is, the data is not correctly transmitted. In order to reproduce the original data correctly without any omission of the fine lines at the side of the receiver, it has been common practice to process the original data in accordance with the following logical operational expression to convert a picture image data of the original document corresponding to two lines to a picture image data corresponding to one line and then transmit it to the receiver side.

$$C' = B + C \quad (1)$$

where C' denotes a transmitting picture image data subjected to a logical operation and corresponding to one line, C denotes a picture image data on the current scanning line and B denotes a picture image data on the previous scanning line. When the read picture image data corresponding to two lines is converted to a picture image data corresponding to one line and then transmitted to the receiver side on the basis of the logical expression (1), the amount of data to be processed can be doubled with a constant transmission rate, so that the picture processing efficiency can be increased and the original picture can be correctly reproduced at the receiving side without loss of any fine lines.

The use of such data transmission system based on the coversion from two-line data to one-line data according to the expression (1) usually enables the picture data to be extracted and reproduced at the receiver side without loss of any fine lines of the black picture elements. However, if the previous line corresponds to a black line and the subsequent line corresponds to a white fine line, then the white fine line cannot be reproduced at the receiver side. That is, supposing that a black line is expressed by "1" and a white line is by "0", if the previous lines are all black ones and the corresponding subsequent lines are all white one, then the white fine lines cannot be reproduced at the receiver side, because the logical expression (1) is written as $$1 = 1 + 0$$

which means that the converted picture image data all refer to black.

OBJECT AND SUMMARY OF THE INVENTION

In view of the above problems, it is an object of the present invention to provide a picture image data processor used in a facimile system or the like, which processor can process picture image data with a high efficiency while keeping a transmission rate constant, and also can allow the faithful reproduction of an original document image data at the side of a receiver without losing the original information.

In accordance with the present invention, the above object is attained by providing a picture image data processor which comprises means for processing a picture data C over a current processing line on the basis of a processed picture data A on a previous processing line, a picture data B on a line previous to the current line, the picture data C and a picture data on a line subsequent to the current processing line to generate a new picture data C'.

In the present invention, since a picture image data to be transmitted is generated on the basis of four picture image data corresponding to four lines in transmission of the picture image data converted from two-line data to one-line data, the picture image data corresponding to the original document image can be correctly transmitted to the receiver side.

In accordance with the present invention, the picture image corresponding to the original picture can be reproduced at the receiver side with a constant transmission rate and without loss of any original information.

DESCRIPTION OF THE PREFERRED EMBODIMENTS

An embodiment of the present invention will be detailed with reference the accompanying drawings.

Figure 1:
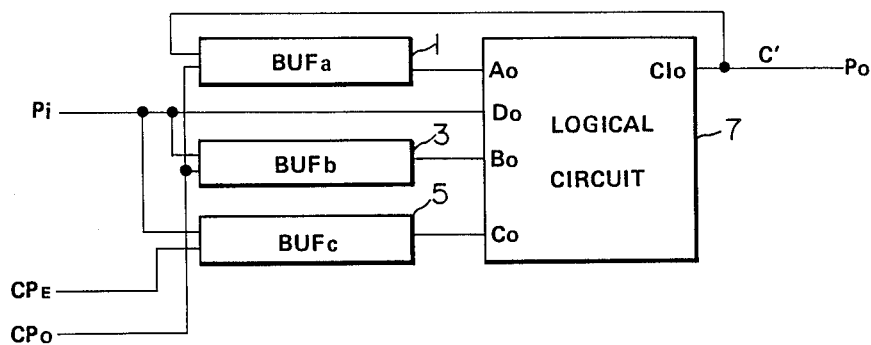
FIG. 1 is a block diagram showing an arrangement of a picture image data processor in accordance with one embodiment of the present invention.
Figure 2:
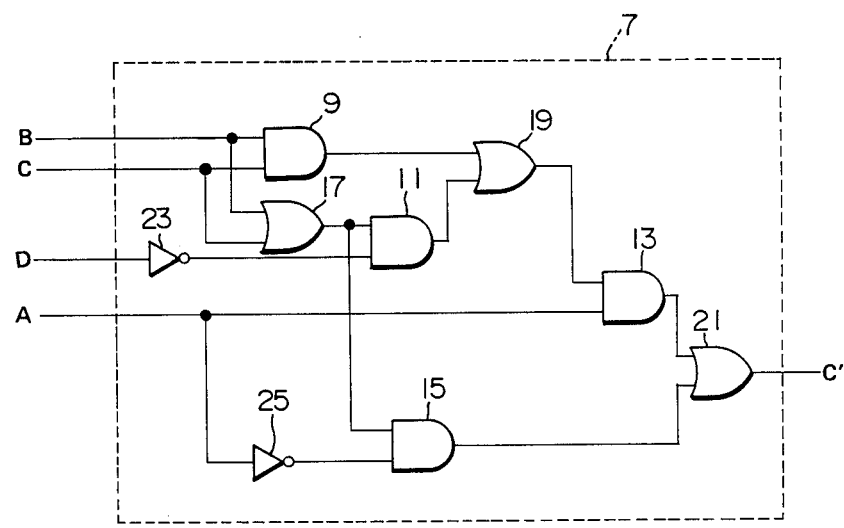
FIG. 2 is a circuit diagram of a logical operation circuit shown in FIG. 1.

Referring to FIG. 1, there is shown an arrangement, in a block diagram, of a picture image processor in accordance with one embodiment of the present invention, which comprises a buffer a (BUFa) 1, a buffer b (BUFb) 3, a buffer c (BUFc) 5 and a logical operation circuit 7. The BUFa 1 acts to temporarily store therein a picture data processed by the logical circuit 7. The BUFb 3 is used to, temporarily store therein picture data concerning, e.g., odd-numbered lines among input data Pi, while BUFc 5 is to temporarily store therein picture data concerning, e.g., even-numbered lines among the input data Pi. The logical circuit 7 comprises, as shown in FIG. 2, AND gates 9, 11, 13 and 15, OR gates 17, 19 and 21, and inverters 23 and 25. The logical circuit 7 receives one-bit picture data A, B and C from the BUFa 1, BUFb 3 and BUFc 5 respectively as well as a one-bit picture data during the current scanning operation; performs a logical operation in accordance with the following expression (2) to generate an output data C', and transmits the output data C' as a transmission data Po and also send it back to the BUFa 1.

$$C' = A\{B \cdot C + (B+C) \cdot D\} + \overline{A}(B+C) \quad (2)$$

In the logical operation, under a condition that the picture data C is white, only if the picture data B is black and the picture data A is white or only if the picture data A is black and the picture data B is black and the picture data D is white, then the picture data C is processed as a black picture data; and in the other cases, the data C is processed as a white picture data to generate the picture data C'. Under a condition that the picture data C is black, only if the picture data B is white and the picture data A and D are black, then the data C is processed as a white picture data; and in the other cases, the data C is processed as a black picture data to generate the picture data C'.

Figures 3, 4:
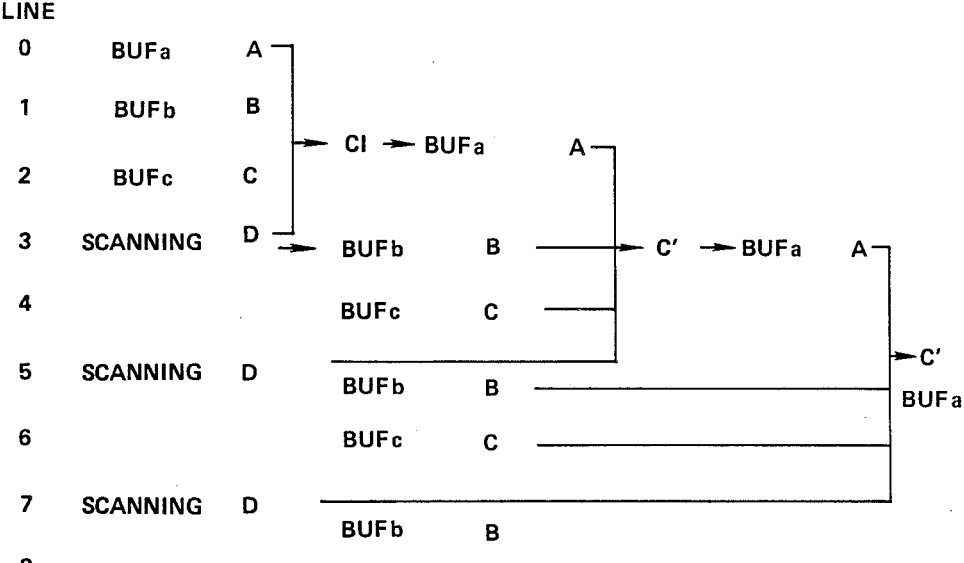
FIGS. 3 and 4 are diagrams for explaining the operation of the present embodiment.

The operation of the present embodiment will next be explained. FIG. 3 illustrates relationships between the picture data on respective lines and buffers in which the data are to be stored respectively, as well as their processing flows. Before the first line is scanned, data corresponding to white picture data has been stored in the BUFa 1, BUFb 3 and BUFc 5. Namely, the contents of the BUFa 1, BUFb 3 and BUFc 5 are all "0". When the first line is scanned, the corresponding one-line picture data is stored in the BUFb 3 under the control of a clock pulse $CP_O$ synchronized with odd-numbered lines. When the second line is scanned, the corresponding one-line picture data is stored in the BUFc 5 under the control of a clock pulse $CP_E$ synchronized with the even-numbered lines. At this stage, no data is stored in the BUFa 1. When the third line is scanned, the picture data D obtained through the scanning operation is applied, together with the output data A, B and C of the BUFa 1, BUFb 3 and BUFc 5, to the logical circuit 7 which performs a logical operation over the received data in accordance with the expression (2) to generate the output data C' that in turn is externally outputted and also fed back to the BUFa 1 to be stored therein. The picture data D concerning the third line is sent to the BUFb 3 and stored therein. A one-line picture data obtained through scanning of the fourth line is stored in the BUFc 5. A picture data resulting from the scanning operation of the fifth line is supplied, together with the output data of the BUFa 1, BUFb 3 and BUFc 5, to the logical circuit 7 where a logical operation is performed over the received data according to the expression (2). The fifth-line data is also sent to the BUFb 3 and stored therein. For scanning of each of the subsequent lines, the similar processing is repeated.

FIG. 4 shows relationships between lines and one-bit picture data about the lines as well as output results when the picture data are converted according to the present embodiment. As illustrated, the first to fifth lines are black "1", the sixth line is white "0" and the seventh line is black "1".

Now suppose that the BUFa 1 is cleared and the content stored therein is "0". When the first, second and third lines are scanned respectively, the first-line data is stored in the BUFb 3, the second-line data is sent to the BUFc 5 and the third-line data is sent to an input terminal $D_O$ of the logical circuit 7. The output data A, B and C of the BUFa 1, BUFb 3 and BUFc 5 as well as the data D during the scanning operation are applied to the logical circuit 7 to be subjected to a logical operation in accordance with the expression (2). In this case, the data A, B, C and D are "0", "1", "1" and "1" respectively, so that the output data C' becomes "1". The output data C' and the scanning data D are sent to the BUFa 1 and BUFb 3 respectively. When the fourth line is scanned, the corresponding data is stored in the BUFc 5. The scanning operation of the fifth line causes the logical circuit 7 to perform its logical operation. In this case, since the data A, B, C and D are "1", "1", "1" and "1" respectively, the output data C' becomes "1". Similarly, the scanning operation of the sixth and seventh lines causes the logical circuit 7 to perform its logical operation. In this case, the output data C' becomes "0" because the data A, B, C and D are "1", "1", "0" and "1" respectively. That is, if the sixth line is white "0", then the output data C' also becomes white "0". However, in the prior art system, under such conditions, the output data C' becomes black "1" and is transmitted to the receiver side, whereby the correct data cannot be reproduced at the receiving side. For the subsequent lines, the corresponding data are subjected to the similar processing to be reproduced at the receiver side.

In this manner, in accordance with the present invention, since the logical operation is carried out on the basis of four picture data corresponding to four lines, the employment of the picture data transmission system based on the conversion from two-line picture data to a one-line picture data enables the faithful reproduction of the original picture data at the receiver side.

Although the logical circuit 7 has been arranged to perform the logical operation in accordance with the expression (2) in the foregoing embodiment, the circuit may be arranged to perform such a logical operation that is expressed by the following expression (3).

$$C' = D(C + B \cdot C) + B(A + A \cdot C) \quad (3)$$

Figure 5:
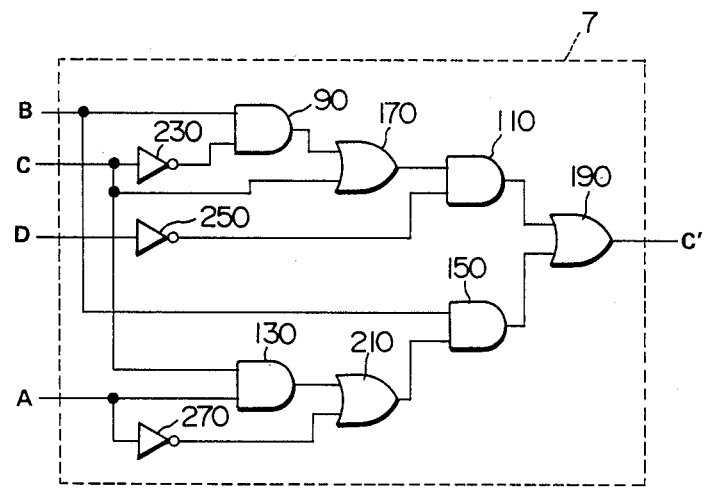
FIG. 5 is a circuit diagram showing another arrangement of the logical circuit shown in FIG. 1.

In this case, the logical circuit 7 comprises AND gates 90, 110, 130 and 150, OR gates 170, 190 and 210, and inverters 230, 250 and 270, as shown in FIG. 5. In the logical operation, under a condition that the picture data C is white, the data C is processed as a black data only when the picture data B is black and the picture data A is white or only when the picture data B is black and the picture data D is white; and in the other case, the data C is processed as a white data to generate the picture data C'. Under a condition that the data C is black, the data C is processed as a white data only when the data B is white and the data D is black; and in other cases, the data C is processed as a black data to generate the picture data C'. The operation of the present embodiment is substantially the same as that of the foregoing embodiment, except that their logical circuits 7 perform their logical operation differently.

What is claimed is:

1. A picture image processor for processing, every other line, data of an original document made up of a plurality of lines to form picture data made up of half of said plurality of lines, said processor comprising:

picture data processing means for performing a predetermined operation over a picture data C, within a current processing line, to form a new picture data C' on the basis of a processed picture data A on a previous processing line, a picture data B on a line previous to said current processing line, said picture data C, and a picture data D on a line subsequent to said current processing line;

input means for inputting said picture data B, C and D; and output means for outputting said new picture data C';

wherein on condition that said picture data C is white, said picture data B is black and said picture data A is white, said picture data processing means processes said picture data C as a black picture data; on condition that said picture data C is white, said picture data A is black, said picture data B is black and said picture data D is white, said picture data processing means processes said picture data C as a black picture data; and on other conditions when said picture data C is white, said picture data processing means processes said picture data C as a white picture data to form said new picture data C'.

2. A picture image processor as set forth in claim 1, wherein said picture data processing means processes said picture data C as a white picture data on condition that the picture data C is black, said picture data B is white and said picture data A and D are black; and said picture data processing means processes the picture data C as a black picture data on other conditions when said picture data C is black to form said new picture data C'.

3. A picture image processor as set forth in claim 2, wherein said picture data processing means performs a logical operation of $C' = A[B \cdot C +) \cdot D] + A(B+C)$.

4. A picture image processor for processing, every other line, data of an original document made up of a plurality of lines to form picture data made up of half of said plurality of lines, said processor comprising:
   picture data processing means for performing a predetermined operation over a picture data C, within a current processing line, to form a new picture data C' on the basis of a processed picture data A on a previous processing line, a picture data B on a line previous to said current processing line, said picture data C, and a picture data D on a line subsequent to said current processing line;
   input means for inputting said picture data B, C and D; and
   output means for outputting said new picture data C';
   wherein on condition that said picture data C is white, said picture data B is black and said picture data A is white, said picture data processing means processes said picture data C as a black picture data; on condition that said picture data C is white, said picture data B is black and said picture data D is white, said picture data processing means processes said picture data C as a black picture data; and on other conditions when said picture data C is white, said picture data processing means processes said picture data C as a white picture data to form said new picture data C'.

5. A picture image processor as set forth in claim 4, wherein said picture data processing means processes the picture data C as a white picture data on condition that the picture data C is black, the picture data B is white and the picture data D is black, and said picture data processing means processes the picture data C as a black picture data on other conditions when said picture data C is black to form said new picture data C'.

6. A picture image processor as set forth in claim 5, wherein said picture data processing means performs a logical operation of $C' = D(C + B \cdot C) + B(A + A \cdot C)$.

7. A picture image processor for processing data of an original document made up of a plurality of lines on every other line to form a picture data made up of half of said plurality of lines, said processor comprising:
   first memory means for storing a processed picture data A on a previous processing line;
   second memory means for storing a picture data B concerning a line subsequent to the previous processing line;
   third memory means for storing a picture data C prior to processing and concerning a current processing line; and
   picture data processing means for performing a logical operation $C' = A[B \cdot C + (B+C) \cdot D] + A(B+C)$ over said picture data C on the basis of said picture data A, B and C stored respectively in said first, second and third memory means as well as on the basis of a picture data D under scanning operation to form a new picture data C'.

8. A picture image processor for processing data of an original document made up of a plurality of lines on every other line to form a picture data made up of half of said plurality of lines, said processor comprising:
   first memory means for storing a processed picture data A on a previous processing line;
   second memory means for storing a picture data B concerning a line subsequent to the previous processing line;
   third memory means for storing a picture data C prior to processing and concerning a current processing line; and
   picture data processing means for performing a logical operation $C' = D(C + B \cdot C) + B(A + A \cdot C)$ over said picture data C on the basis of said picture data A, B and C stored respectively in said first, second and third memory means as well as on the basis of a picture data D under scanning operation to form a new picture data C'.

* * * * *